June 17, 1952     T. J. LEHANE     2,600,889
RAILWAY CAR TEMPERATURE CONTROL SYSTEM
Filed Jan. 5, 1950     3 Sheets—Sheet 1
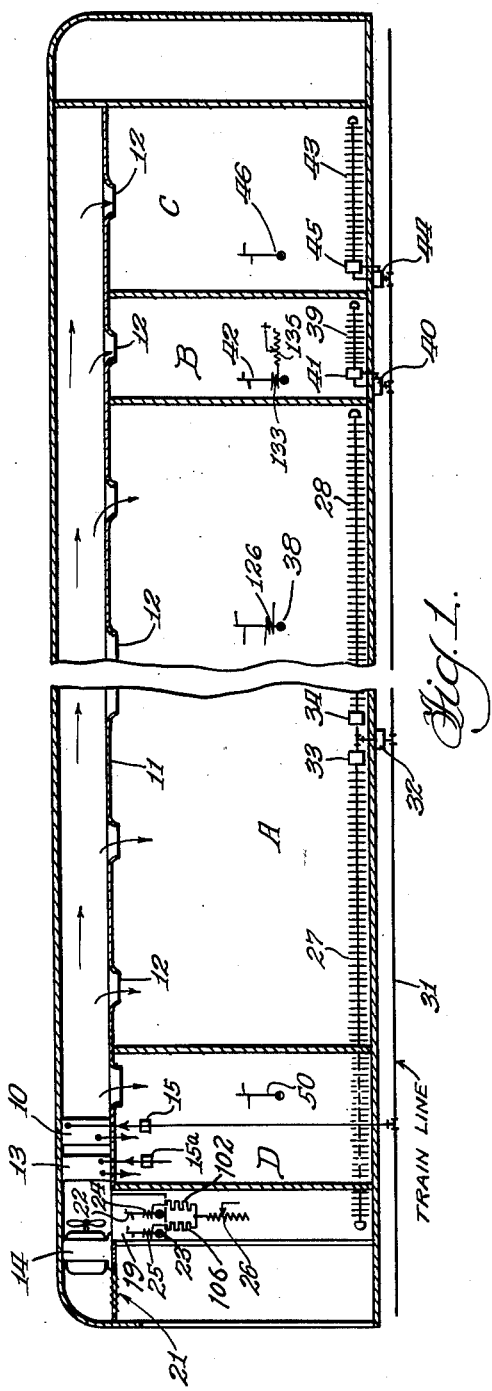
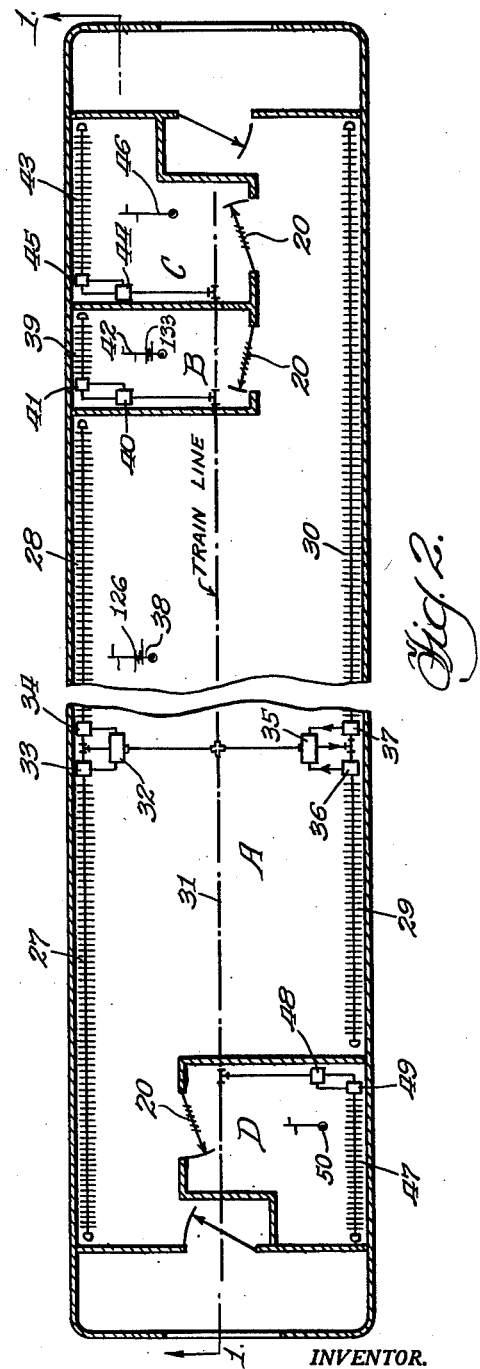
INVENTOR.
Timothy J. Lehane
BY
Harvey M. Gillespie
Atty.

June 17, 1952     T. J. LEHANE     2,600,889
RAILWAY CAR TEMPERATURE CONTROL SYSTEM
Filed Jan. 5, 1950     3 Sheets-Sheet 2
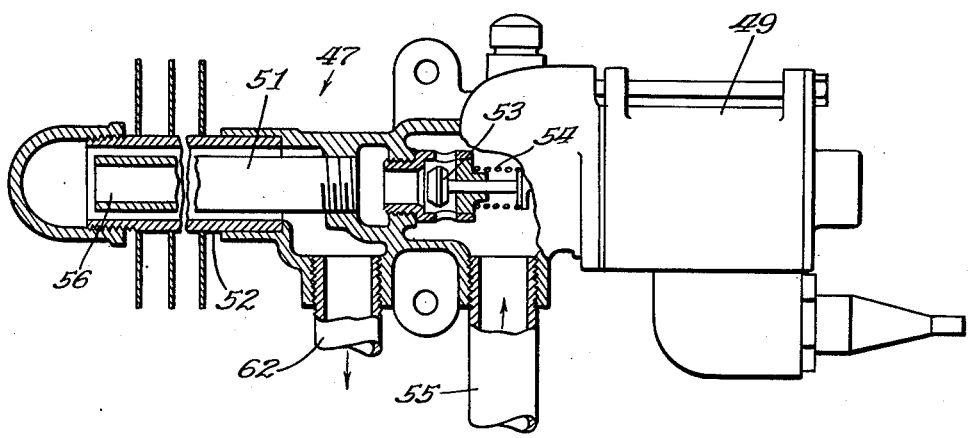
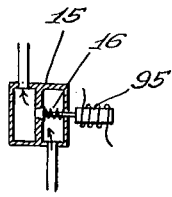
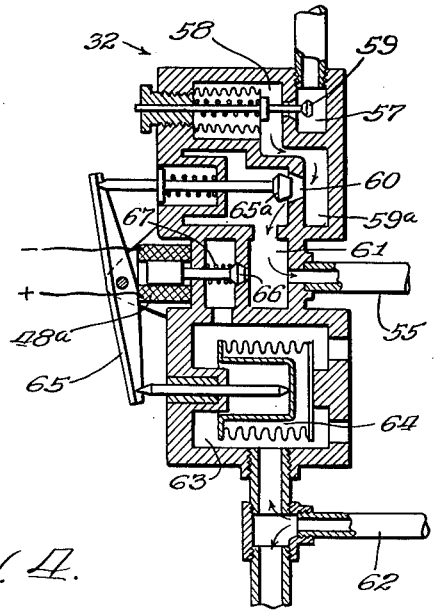
INVENTOR.
Timothy J. Lehane
BY
Harvey M. Gillespie
Atty June 17, 1952 — T. J. LEHANE — 2,600,889
RAILWAY CAR TEMPERATURE CONTROL SYSTEM
Filed Jan. 5, 1950 — 3 Sheets-Sheet 3

INVENTOR.
Timothy J. Lehane
BY Harvey M. Gillespie
Atty.

Patented June 17, 1952

2,600,889

UNITED STATES PATENT OFFICE 2,600,889

RAILWAY CAR TEMPERATURE CONTROL SYSTEM

Timothy J. Lehane, North Riverside, Ill., assignor to Vapor Heating Corporation, Chicago, Ill., a corporation of Delaware Application January 5, 1950, Serial No. 136,988

5 Claims. (Cl. 257—3)

This invention relates to a railway car temperature control system for selectively controlling the operation of heating and cooling apparatus.

A principal object of the invention is to provide a simplified control system including certain heating and cooling thermostats, which normally function at the same temperature and are simultaneously adjustable to raise or lower their normal settings, are cooperatively connected in the control system so that heating and cooling apparatus for altering the temperature of the car may pass from its heating to its cooling function at the normal temperature settings of said thermostats, and so that the heating control thermostat, during said transition of the system from its heating to its cooling function, is automatically adjusted to a lower temperature setting so that the cooling control thermostat will retain its control of the system until the temperature within the car falls below the adjusted lower temperature setting of the heating control thermostat.

Another object is to provide a control system of the above character in which the heating means include an overhead heater for heating a stream of air delivered into a plurality of compartments and also includes separately controlled heat radiating elements located in the separate compartments near the floor thereof and functioning individually, but under the domination of the overhead heater controls, to add heat directly to the atmosphere within the compartments and thereby cooperate with the overhead air heater to maintain uniform temperatures in certain of the compartments and variable temperatures in others.

The invention may be briefly described as comprising an apparatus selectively operable for heating or cooling a stream of air and delivering the same into a plurality of compartments, constituting subdivision of a main enclosure, and a plurality of radiators which are operable, under predetermined conditions to add heat directly to the atmosphere within the individual compartments near the floor level thereof.

The operation of the air heating and cooling means is selectively controlled by separate control thermostats which are so located as to respond to the collective temperature of all of the said compartments. These thermostats are constructed to function at the same temperatures and are connected in the control system in parallel relation. However, the said thermostats may be manually adjusted to simultaneously raise or lower temperature settings.

The radiators for delivering heat into the separate compartments are under the direct control of individual thermostats each of which responds to the temperature of the compartment in which it is located to shut off the delivery of heating medium to its radiator, but it is effective to bring about the delivery of heating medium to its associated radiator only when the control thermostat of the main air heater is calling for heat.

Provision is also made for manually adjusting at least one of the compartment control thermostats whereby a higher or lower temperature may be maintained therein during the heating cycle of the system, but this higher or lower temperature is subject to the general domination exercised by the air heater control elements. For example, when the air heater control thermostat is satisfied, the admission valves of all floor radiators are closed so as to shut off the delivery of heating medium to the floor radiators regardless of the temperature within one or more of the individual compartments.

During the cooling function of the system the supply of heating medium, in addition to being shut off from the floor radiators, is also shut off from the radiator admission valves so as to prevent the radiation of heat into the compartment from the supply valve casing or any branch supply duct associated therewith. The last mentioned result is obtained by virtue of the energization of a solenoid by-pass valve which is energized during the cooling function of the system to by-pass heating medium around the radiators from the source of supply to a thermostat which functions to close a main supply valve.

The invention is illustrated in the accompanying drawings wherein:

Fig. 1 is a vertical sectional view taken longitudinally through a railway car and illustrating the location of certain heating and cooling elements forming parts of the present invention.

Fig. 2 is a diagrammatic plan view taken horizontally through the car shown in Fig. 1 and illustrating the arrangement of the several compartments of the car and the floor radiator positioned therein.

Fig. 3 is a view partly in section illustrating the construction of one of the floor radiators.

Fig. 4 is a diagrammatic view of one of the several pressure regulating valves utilized in the present embodiment of the invention for contracting the delivery of steam at reduced pressure to the floor radiators.

Fig. 5 is a diagrammatic illustration of one of the electrically controlled admission valves associated with the overhead heating and cooling elements of the system.

Figure 6:
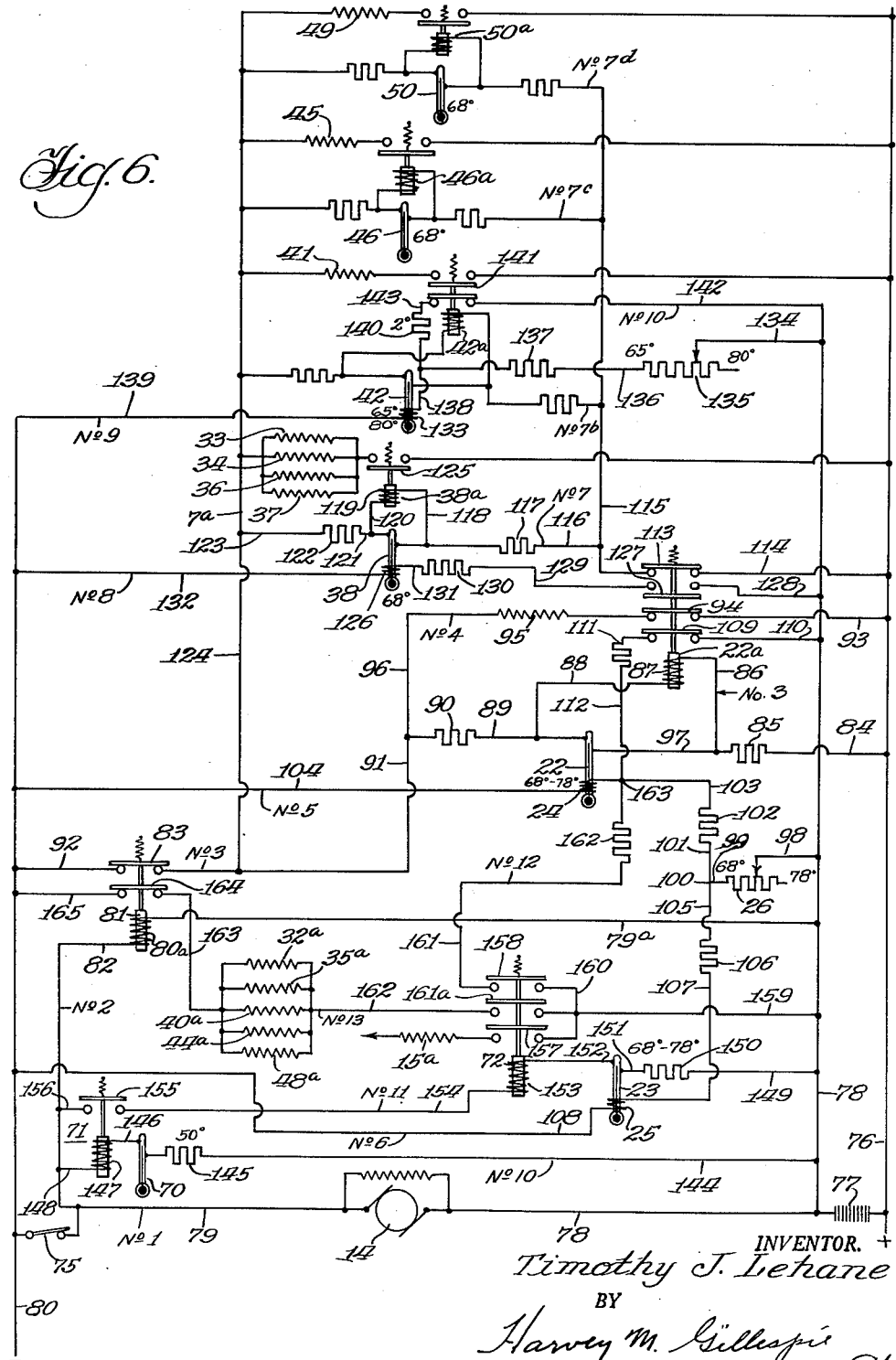
Fig. 6 is a wiring diagram of the electrical circuits for controlling the operations of the several elements of the heating and cooling apparatus.

The invention is illustrated in connection with a railway passenger car which is subdivided to provide a main passenger compartment A and a plurality of smaller compartments, the compartments B and C being located at one end of the car and a compartment D being located at the other end of the car. It is to be understood, however, that the particular subdivision and arrangement of compartments is merely for convenience of illustration and that the invention is not limited to the specific compartment arrangement shown.

The invention, while being directed to a temperature control system necessarily contemplates a means for altering the temperature of the car. Such means, in the present instance, includes an air tempering apparatus for heating and/or cooling a stream of air and delivering the same into the upper portion of each of the compartments shown and means for selectively operating the air heating and cooling elements in response to predetermined temperature conditions. The temperature altering means also includes heat radiating elements located in the several compartments near the floor level thereof. Each said radiator adds heat directly to the atmosphere within its associated compartment and cooperates with the air heater to maintain a desired temperature therein.

The air heater is designated by the reference numeral 10 and is located at one end of the car in an overhead duct 11. This duct extends substantially the full length of the car and is provided with outlets 12 at suitable locations for delivering the tempered air into the several compartments. An air cooler 13 is positioned between the heater 10 and a blower 14 so that the same blower may be used during both the heating and cooling functions of the apparatus. The heater 10, in the present invention, utilizes steam as a heating medium, the steam being taken from a train line 31 and delivered to the heater 10 through an electrically controlled admission valve 15; the valve being shown diagrammatically in Fig. 5. This valve is normally closed by means of a spring 16 and is opened by the energization of an actuating solenoid 95. The energization of the solenoid 95 (for the air heater) is under the control of a thermostat 22 located, preferably, in a return air duct 19 so as to respond to the temperature of the air returning from all compartments and thereby represent the temperature of the car as a whole. The doors of the several compartments B, C and D are provided with grills 20 to permit the air to pass out of the compartments and flow to the air return duct 19. As an alternative, the duct 19 may discharge the air withdrawn from the compartments directly to the outside of the car. In such case fresh air may be supplied through a grill 21; this grill being shown open in Fig. 1, but is adapted to be closed manually.

The operation of the steam admission valve 15 is controlled by a thermostat 22 while is responsive to the temperature of the car as a whole. Inasmuch as the temperature of the air in the duct 19 bears a definite relation to the temperature of the car, as a whole, the thermostat 22 is preferably located in or near the duct 19.

The air cooler 13 is provided with an electrically opened valve of the same general construction as shown in Fig. 5 and, for the purpose of convenience, is designated 15ª in Fig. 1. The operation of the coolant valve 15ª is controlled by a thermostat 23 located in the said return duct 19 so as to respond to the same temperature influence as the heater control thermostat 22. Both thermostats 22, 23 have the same normal temperature settings and are provided with like auxiliary heaters 24, 25 connected in circuit with a variable resistor 26, whereby the normal temperature settings of both thermostats 22, 23 may be simultaneously raised or lowered by varying the amount of current to the electric heaters 24, 25. It is intended, as will be hereinafter more fully pointed out, that the control function of the system, under predetermined outside and inside temperature conditions, is moved direct from the heating function into the cooling function of the system without the usual space or dead band between the temperature settings of the air heating and cooling control thermostats.

*Floor heat*

As before indicated, heat radiators are located in each of the compartments A, B, C, and D. There are four such radiators located in the compartment A and are designated 27, 28, 29 and 30, respectively. The radiators 27 and 28 are located at one side of the car and are supplied with steam from the steam train pipe 31. The pressure of the steam is reduced by passing it through a combined reducing and shut off valve designated generally by the reference numeral 32. This valve functions to automatically reduce the high pressure steam to approximately atmospheric pressure and, under certain conditions, hereinafter described, function to shut off the steam. The delivery of the steam to the several radiators is controlled by electrically actuated admission valves designated generally by reference numerals 33, 34. The steam flows from the steam train pipe 31 to the radiators 29, 30 located at the other side of the car, through a pressure reducing and shut off valve 35. The admission of the low pressure steam to the radiators 29, 30 is controlled by electrically operated admission valves 36 and 37 (Fig. 1). All of the admission valves 33, 34, 36 and 37 are simultaneously controlled by a thermostat 38 which responds to the temperature within the compartment A.

The floor radiator in compartment B is designated 39. It is supplied with steam from train pipe 31 through a pressure reducing and shut off valve 40, the low pressure steam being admitted to the radiator through a solenoid admission valve 41 controlled by thermostat 42 which is responsive to the temperature of compartment B. The floor radiator of compartment C is designated 43 and is similarly supplied with steam through a pressure reducing and shut off valve 44 and electrically actuated admission valve 45, the latter of which is controlled by thermostat 46 located in compartment C and responsive to the temperature therein. The floor radiator of compartment D is designated 47. The steam for this radiator is delivered from the train pipe 31 through a pressure reducing and shut off valve 48 and an admission valve 49, the latter of which is controlled by a thermostat 50 responsive to the temperature of the compartment D.

All of the pressure reducing and steam shut off valves 32, 35, 40, 44 and 48 are of like construction, the valve 32 being shown in diagrammatic section in Fig. 4. The admission valves 33, 34, 36, 37, 41, 45 and 49 are of identical construction.

The radiator and admission valve shown in Fig. 3 represents the radiator 47 and admission valve 49, but inasmuch as all radiators and valves are of like construction, except as to size of the radiator, the structure is exemplary of all such structures. The said radiator comprises inner and outer concentric pipes 51 and 52, respectively, connected at their inner ends into a valve casing. A valve 53 is normally held open by a spring 54 to permit low pressure steam to flow from supply pipe 55 into the inner feed pipe 51. The steam is discharged from the outer end 56 of the inner pipe into the outer pipe 52. The condensation is discharged from the outer pipe 52 through the discharge pipe 62.

*Pressure reducing and steam supply valves*

The pressure reducing and steam supply valves herein shown are illustrated in diagrammatic section in Fig. 4, but it is not claimed herein apart from the combination shown. However, in order to disclose the controlling functions thereof in the present invention, the valve structure is briefly described as follows. Steam at train pipe pressure enters the chamber 57 and passes into chamber 58. When the pressure in chamber 58 reaches a predetermined point, the pressure actuated valve 59 is closed to a position to maintain the desired pressure in chamber 58. When the admission valve 35 of a radiator is open, steam flows from chamber 58 into chamber 59a and thence through valve port 60 into supply chamber 61, and through pipe 55 leading to the inlet end of the radiator. When the radiator is filled with steam, the steam, together with condensation, is discharged through pipe 62. The discharged steam passes upwardly from discharge pipe 62 into a thermostat chamber 63 and functions to expand a bellows thermostat 64 therein. The expansion of thermostat 64 rocks a lever 65 and thereby closes a spring opened valve 65a to close port 60 and thereby shut off the delivery of steam to the radiator admission valve. The above pressure reducing valve structure also includes a valve 66 normally closed by spring 67, but adapted to be opened by predetermined steam pressure in chamber 61 or by the energization of a solenoid 48a. When the valve 66 is opened, steam is by-passed from chamber 61 around the radiator and directly through chamber 63 to the thermostat 64, whereupon the expansion of thermostat 64 rocks the lever 65 to close the supply valve 65a.

The energization of solenoids 48a of the five pressure reducing and shut off valves 32, 35, 40, 44 and 48, herein shown, are controlled by electrical circuits requiring the conjoint functioning of an outside thermostat 70 (Fig. 6) and the cooling control thermostat 25. The outside thermostat 70 is preferably set to function at 50° F. and controls a relay 71 interposed in a circuit for energizing a cooling pilot relay 72. The cooling control thermostat 23 is also connected in the energizing circuit of the cooling pilot relay 72. Consequently the said cooling pilot relay requires the functioning of both thermostats 70 and 23 and therefore remains de-energized so long as the outside temperature is at the temperature setting of 50° F. for the the outside thermostat 70 or the inside temperature at the return duct 19 stands below the temperature setting of the cooling control thermostat 23. It will be observed, therefore, that the cooling apparatus, including the cooler 13, valve 15a and other mechanism associated therewith, but not shown, are made effective by the energization of the cooling pilot relay 72. When this relay is de-energized, the solenoids 32a, 35a, 40a, 44a and 48a for actuating the steam by-pass valve 66 in the several pressure reducing and steam shut off valves 32, 35, 40, 44 and 48 are de-energized. Consequently steam is permitted to pass into such of the floor radiators as may require steam. However, all floor radiators are under the domination of the air heater controls, the relays 38a, 42a, 46a and 50a and their respective control thermostats 38, 42, 46 and 50 are all connected through an energized closed contact 113 of the relay 22. Consequently the said relays 38a, 42a, 46a and 50a are de-energized and thereby permit the several floor heat admission valves to open to permit steam to enter the said radiators only when the air heater relay 22a is energized closed and steam is being delivered to the overhead air heater.

*Control circuits*

The several control elements shown in Fig. 6 are shown in the positions which they will assume when the main switch 75 is closed, the outside temperature is below 50° F., the temperature setting of outside thermostat 70, the cooling control thermostat 23 is open at its contacts, and heat control thermostats 22, 38, 42, 46 and 50 are calling for heat.

Under the above assumed condition, the closing of the main switch 75 closes an energizing circuit through the blower 14. This circuit designated No. 1 leads from positive line 76 through a wattage regulator 77, wire 78, blower motor 14, wire 79 and main switch 75 to the negative line. The blower motor, it will be observed, operates continuously during the functioning of the control system regardless of whether the system is functioning to supply heated air or to supply cooled air. Another circuit designated No. 2 leads from the positive line 76 through wattage regulator 77 and bus conductor 78 to wire 79a, solenoid coil 80a of relay 81 and thence through wires 82, 79 and switch 75 to the negative line 80. This circuit energizes the relay 81 to close its contact 83 and thereby closes a circuit No. 3 for energizing the relay 22a to close a circuit through admission valve 15 to admit steam to the air heater 10. This circuit leads from the negative line 76 through wire 84, resistor 85, wire 86, solenoid coil 87 of relay 22a, wires 88 and 89, resistor 90 to wire 91 and thence through closed contact 83 of relay 81 and wire 92 to the negative line 80. As long as the air heat thermostat 22 is calling for heat the said relay 22a will remain energized to close an energizing circuit through the steam admission valve 15 for supplying steam to the air heater 10. This valve energizing circuit is designated generally as No. 4 and leads from positive line 76 through wire 93, closed contact 94 of relay 22a and thence through the actuating solenoid 95 and wires 96 to wire 91 and thence through circuit No. 3 to the negative line 80. The valve 15 will remain open until the temperature at the thermostat 22 is sufficient to cause its mercury column to engage the upper contact. When this occurs the electrical current in circuit No. 3 passes direct from resistor 85 through wire 97, mercury column of thermostat 22 to the upper contact and thence through wire 89, resistor 90, wire 91, etc., to the negative line 80; thereby by-passing the electric current around the relay solenoid 87 so as to de-energize the relay 22ª, whereupon the relay moves to the position to open its said contacts and thereby de-energize the solenoid 95 to close the supply valve 15.

The temperature setting of air heat control thermostat 22 and cooling control thermostat 23 are preferably the same but are capable of being adjusted simultaneously up or down within a range of 10°. The desired temperature setting is obtained by virtue of electrical heaters 24 and 25 associated with the thermostats 22 and 23. The energizing circuit for both heaters includes branches No. 5 and No. 6. The circuit through the heater 24 leads from the positive line 76 through wattage regulator and bus conductor 78 through wire 98, variable resistor 26 and wire 99 to a junction 100. A portion of the current then flows through wire 101, resistor 102, having a maximum heating value of 10°, wire 103, electrical heater 24 and wire 104 to the negative line 80. The other portion of the electrical current passes through the branch circuit No. 6 to energize the heater 25 of the cooling control thermostat 23. This branch circuit leads from junction 100 through wire 105, resistor 106, having a maximum value of 10°, wire 107, electrical heater 25 and wire 108 to the negative line 80. The variable resistor 26 has a maximum value of 20° and the resistors 102 and 106, as before indicated, have a maximum value of 10° each. Consequently when all of the resistance 26 is removed from the circuit the thermostats 22 and 23 have a functional setting of 68° F. When all of the resistance 26 is included in the circuit the said thermostats 22 and 23 have a functional setting of 78° F. With the present adjustment of the variable resistor 26, as illustrated in Fig. 6, both thermostats 22 and 23 have a temperature setting of approximately 75°.

The energization of relay 22ª also closes its contact 109 to close a momentary energizing circuit for adding additional current to the heater 24. This circuit leads from bus conductor 78 through wire 110, closed contact 109 of relay 22, resistor 111 (having maximum value of 2°) and wires 112 and 103 through the heater 24 and thence through wire 104 to the negative line. When the thermostat 22 closes at its upper contact, the said relay 22ª is de-energized and thereby automatically removes the 2° added to the heater 24 through the resistor 111. This cycling operation will continue until the temperature of the return air in duct 19 is sufficient to maintain the mercury column of thermostat 22 in engagement with its upper contact.

When the air heat control relay 22ª is energized closed its contact 113 directs electrical current from the positive line 76 through wire 114, closed relay contact 113 and positive bus conductor 115, the latter of which supplies electrical current for the energization of the several relays 38ª, 42ª, 46ª and 50ª for controlling the delivery of steam through the several admission valves to the floor radiators. The relay 38ª is energized by a circuit designated No. 7 and leads from the positive bus conductor 115 through wire 116, resistor 117, wire 118, relay solenoid 119, wire 120, wire 121, resistor 122 and wires 123 and 124 to wire 91 and thence through circuit No. 3 to the negative line. When the relay 38ª is energized the admission valve solenoids 33, 34, 36 and 37 are de-energized and consequently permit the steam admission valve of the several radiators 27, 28, 29 and 30 to admit steam to said radiators. As soon as the thermostat 38 is satisfied the electrical circuit No. 7 passes directly through the contacts of the thermostat so as to by-pass the electric current around the relay solenoid 119 and thereby permit the relay contact 125 to close, whereupon the said solenoids 33, 34, 36 and 37 are again energized to close the steam admission valves of the several radiators in compartment A. Similar energizing circuits are closed through the actuating solenoids of relays 42ª, 46ª and 50ª to energize the admission valve solenoids 41, 45 and 49, respectively. These several relay energizing circuits are substantially the same as described in connection with relay 38ª and therefore are given the same reference circuit numbers with the exponents b, c and d, respectively.

The thermostat 38 for controlling the relay 38ª may have any suitable temperature setting, for example 68° F., without the influence of electrical heat. However, this thermostat is provided with an electrical heater 126 whose energizing circuit No. 8 is connected through de-energized closed contact 127 of relay 22ª. This circuit leads from the positive bus conductor 78 through wire 128, de-energized closed relay contact 127, wire 129, resistor 130, wire 131 and wire 132 to the negative line 80. The said resistor 130 has a heating value of 7°. Consequently, 7° of heat is added to the thermostat heater 126 when the relay 22ª is de-energized. In other words, when the supply of steam to the air heater 10 is interrupted, 7° of heat is supplied to resistor 130 to the floor heat thermotsat 38 so as to bias it towards its closed position. When the thermostats 38, 42, 46 and 50 are closed, while the relay 22ª is closed, the relays controlled by said thermostats (38, 42, 46 and 50) will be closed, but when the relay 22ª is de-energized the relays 38ª, 42ª, 46ª and 50ª are automatically de-energized so as to close the admission valves controlled thereby. The thermostats 46 and 50, as before indicated, respond to the temperature of the lounges C and D and may have any suitable setting, for example 68°. However, the thermostat 42 located in compartment B, which in the present embodiment is a nurses' room, is provided with an electrical heater 133 and a variable energizing circuit therefor so that the temperature setting of thermostat 42 may be varied, for example from 65° to 80°. The energizing circuit for the electrical heater 133 is designated generally as circuit No. 9 and leads from the positive bus conductor 78 through wire 134, variable resistor 135, wire 136, metered resistance 137, having a value of 15°, wire 138, heater 133 and wire 139 to the negative line 80. The variable resistor 135 has a maximum value of 15° and corresponds to the maximum value of the resistor 137. When the total variable resistance 135 is excluded from the circuit the thermotsat 42 will have a temperature setting of 65° F. When all of the resistance 135 is included in the heater circuit the thermostat 42 will have a temperature setting of 80° F. Thermostat heater 133 also receives additional heating current through cycle resistor 140 when the relay 42ª is energized to close contact 141 thereof. This cycling circuit is designated No. 10 and leads from the positive bus conductor 78 to wire 142, closed contact 141 of relay 42ª, wire 143, cycle resistor 140 to wire 138 and thence through heater 133 and wire 139 to the negative line 80. Each time that the relay contact 141 is closed the additional heating circuit is applied. Consequently, the steam is delivered in the form of momentary puffs into the radiator 39 when the temperature at thermostat 42 comes within 2° of its temperature setting.

*Cooling function of system*

As long as the outside thermostat 70 remains unsatisfied, that is to say as long as the outside temperature remains below 50° F., the relay 71 remains de-energized and consequently the energization of cooling control relay 72 cannot be energized. However, when the outside temperature rises to 50° F. the thermostat 70 is closed and consequently closes an energizing circuit through the actuating solenoid of relay 71. This circuit is designated generally as No. 10 and leads from positive bus conductor 78 through wire 144, resistor 145 and through the mercury column of thermostat 70 to its upper contact and thence through wire 146, relay solenoid 147 and wire 148. The energization of relay 71 closes a circuit No. 11 up to the upper contact of air cooler control thermostat 23 so that when the temperature in the return duct 19 reaches the temperature setting of thermostat 23 an energizing circuit No. 6 is closed through the actuating coil of relay 72. This circuit (No. 6) leads from positive bus conductor 78 through wire 149, resistor 150, wire 151 to lower contact of thermostat 23, thence through mercury column to the upper contact of said thermostat and wire 152, solenoid coil 153 and wire 154 through closed contact 155 of relay 71 and wire 156 to wire 82 and thence through circuit No. 2 to the negative line 80. The energization of relay 72 closes its contact 157 and thereby energizes the solenoid valve 15ᵃ to open the same and deliver coolant to the cooling element 13. The energization of the cooler control relay 72 also closes its contact 158 and thereby closes a circuit designated 12 through the electrical heater 24 of the air heater thermostat 22. This circuit leads from the positive bus conductor 78 through wire 159, wire 160, closed contact 158, wire 161, resistor 162 to junction 163 and thence through heater 24 by way of circuit 5 to the negative line. The resistor 162 has a heat value of 24° so that the temperature setting of heat control thermostat 22 will be lowered 24° from its normal temperature setting and therefore insures that the cooler control thermostat 23 will retain control of the system for a substantial period of time (the time required to dissipate 24° of heat from heater 24) after the cooler control thermostat 23 has receded below its upper contact. It will be observed, therefore, that the thermostat 23 for controlling the functioning of the cooler 13 will retain its control of the system until the temperature within the car has been lowered sufficiently to warrant returning the control functions to the heat control thermostat 22.

It will be observed also that when the system is performing its cooling function, that is to say when the cooler control relay 72 is energized, an energizing circuit is closed through the actuating solenoids 32ᵃ, 35ᵃ, 40ᵃ, 44ᵃ and 48ᵃ of the several pressure reducing and steam shut off valves 32, 35, 40, 44 and 48 so as to open the steam by-pass valve 66 thereof and by-pass the steam direct from the chamber 61 around the radiator supply pipe 55 and into the thermostat chamber 63, whereby the expansion of the thermostat 64 rocks the lever 65 and thereby closes the steam supply valve 65ᵃ. The energization of the steam by-pass valve solenoids 32ᵃ, 35ᵃ, 40ᵃ, 44ᵃ and 48ᵃ is accomplished through circuit No. 13 which is connected through closed contact 161 of relay 72, wire 162, each of the solenoids 32ᵃ, 35ᵃ, 40ᵃ, 44ᵃ and 48ᵃ, connected in parallel, wire 163, closed contact 164 of relay 81 and wire 165 to the negative line 80.

I claim:

1. An apparatus for controlling the temperature of a plurality of compartments comprising an air heater and an air cooler selectively operable for delivering tempered air into said compartments, means defining a passage to receive the tempered air discharged from said compartments, means including a thermostat responsive to a predetermined temperature of the tempered air withdrawn from all of said compartments for controlling the effectiveness of said air heater, means including a cooler control thermostat responsive to said predetermined temperature of said air discharged from said compartments for controlling the effectiveness of said air cooler, means for simultaneously adjusting the normal temperature settings of the air heater and said air cooler thermostats to function at the same temperature and comprising separate electrical heaters for said thermostats, a variable resistor and energizing circuit means for both of said electrical heaters connected through said variable resistor, a cooler control relay, an energizing circuit therefor connected through said cooler control thermostat, whereby said air cooler is made effective when the cooler control thermostat functions and takes control of the system, a second relay having a moveable contact in the energizing circuit for said cooler control relay and cooperating with said cooler control thermostat to close the said energizing circuit for the cooler control relay, an energizing circuit for said second relay, and an outside thermostat interposed in the last mentioned energizing circuit and set to function at a predetermined outside temperature, whereby said cooler control relay is caused to function when the outside thermostat and said cooler control thermostat are closed.

2. An apparatus for controlling the temperature of a plurality of compartments comprising an air heater and an air cooler selectively operable for delivering tempered air into said compartments, means defining a passage to receive the tempered air discharged from said compartments, means including a thermostat responsive to a predetermined temperature of the tempered air withdrawn from all of said compartments for controlling the effectiveness of said air heater, means including a cooler control thermostat responsive to said predetermined temperature of said air discharged from said compartments for controlling the effectiveness of said air cooler, means for simultaneously adjusting the normal temperature settings of the air heater and said air cooler thermostats comprising separate electrical heaters for said thermostats, a variable resistor and energizing circuit means for both of said electrical heaters connected through said variable resistor, a cooler control relay, an energizing circuit therefor connected through said cooler control thermostat, a second relay provided with a moveable contact interposed in the energizing circuit for said cooler control relay and cooperating with said cooler control thermostat to close the said energizing circuit for the cooler control relay, an energizing circuit for said second relay, an outside thermostat interposed in the last mentioned energizing circuit and set to function at a predetermined outside temperature, whereby said cooler control relay is caused to function when the outside thermostat and said cooler control thermostat are closed, and means effective to automatically adjust the air heater control thermostat to a lower temperature setting comprising an electric conductor connected through an energized closed contact of the cooler control relay and leading to the electrical heater of the air heater control thermostat to direct additional heating current thereto.

3. An apparatus for controlling the temperature of a plurality of compartments comprising an air heater and an air cooler selectively operable for delivering tempered air into said compartments, means defining a passage to receive the tempered air discharged from said compartments, means including an air heater control relay, an energizing circuit therefor, a thermostat responsive to a predetermined temperature of the air withdrawn from all of said compartments for closing an energizing circuit for controlling the effectiveness of said air heater, means including a cooler control thermostat responsive to said predetermined temperature of the air withdrawn from said compartments for controlling the effectiveness of said air cooler, means for simultaneously adjusting said air heater control thermostat and said cooler control thermostat comprising means for applying equal amounts of heat to each of said thermostats, means including a relay connected in series with said cooler control thermostat, and an energizing circuit for the relay and an outside thermostat set to function at a predetermined temperature to close said relay energizing circuit and thereby make said cooler control thermostat effective, means for directing an additional amount of heat to the air heater control thermostat to adjust it to a lower temperature setting than that of said cooler control thermostat, and circuit means effective when the air heater control thermostat is calling for heat to direct a small amount of heating current thereto comprising an electrical connector connecting through an energized closed contact of said heater control relay and provided with a metered resistance therein to limit the delivery of added heating current.

4. An apparatus for controlling the temperature of a plurality of compartments comprising an air heater and an air cooler selectively operable for delivering tempered air into said compartments, means defining an air passage for receiving air discharged from said compartments, air heater control means comprising a relay and a control thermostat therefor responsive to the temperature of said discharged air, air cooler control means comprising a relay and a control thermostat therefor responsive to the temperature of said discharged air, means comprising a floor heat radiator for adding heat directly to the atmosphere within an individual compartment, means for controlling the delivery of heating medium to said floor radiator comprising an energized closed electrically operated admission valve, an energizing circuit for said valve including an energized open relay, an energizing circuit for said relay connected through an energized closed contact of the air heater control relay, whereby said floor radiator control means is effective to control the delivery of heating medium to said radiator only when the air heater control means is energized, a thermostat responsive to the temperature of said individual compartment connected in shunt with the floor radiator control relay for by-passing the energizing circuit around the same when the said individual compartment acquires a predetermined temperature, a solenoid supply valve for controlling the delivery of heating medium to said radiator admission valve and an energizing circuit for said solenoid supply valve connected through an energized closed contact of the air heater control relay, and circuit means connected through the cooler control relay for adjusting the air heater control relay to a functional setting lower than that of the cooler control thermostats, whereby all heating medium to the floor heat radiators is shut off when the air cooler control relay is energized.

5. An apparatus for controlling the temperature of a plurality of compartments comprising an air heater and an air cooler selectively operable for delivering tempered air into said compartments, means defining an air passage for receiving air discharged from said compartments, air heater control means comprising a relay and a control thermostat therefor responsive to the temperature of said discharged air, air cooler control means comprising a relay and a control thermostat therefor responsive to the temperature of said discharged air, separate floor heat radiators for adding heat directly to the atmosphere within the several compartments, an electrically operated admission valve for each floor radiator, energizing circuits for the separate admission valves including in each case an energized closed relay, means providing energizing circuits for the floor heat relays and connected in parallel relation through an energized closed contact of the air heater control relay whereby the control relays for the several floor heat radiators can be effective only when the air heater control relay is energized, separate thermostats for the several individual compartments and responsive to the temperature therein and being in each case connected in shunt with the solenoid of an associated floor heat radiator control relay, whereby the energizing circuit for the relay solenoid of a selected individual compartment is shunted around such solenoid when the individual compartment thermostat is closed, and means for adjusting the temperature setting of at least one of the individual compartment thermostats.

TIMOTHY J. LEHANE.

REFERENCES CITED

The following references are of record in the file of this patent:

UNITED STATES PATENTS

| Number | Name | Date |
| --- | --- | --- |
| 2,138,505 | Parks | Nov. 29, 1938 |
| 2,284,764 | Parks | June 2, 1942 |
| 2,346,592 | Lehane et al. | Apr. 11, 1944 |
| 2,478,588 | Lehane et al. | Aug. 9, 1949 |
| 2,494,624 | Lehane | Jan. 17, 1950 |
| 2,495,861 | Newton | Jan. 31, 1950 |